US012628748B2

(12) United States Patent (10) Patent No.: US 12,628,748 B2

Fernando et al. (45) Date of Patent: May 19, 2026

(54) GROWING MEDIUM

(71) Applicant: COCOGREEN (UK) LTD, Greater Manchester (GB)

(72) Inventors: Bomirige Sudesh Sanjeeva Fernando, Greater Manchester (GB); Thomas William Ogden, Greater Manchester (GB)

(73) Assignee: COCOGREEN (UK) LTD, Greater Manchester (GB)

( * ) Notice: Subject to any disclaimer, the term of this patent is extended or adjusted under 35 U.S.C. 154(b) by 63 days.

(21) Appl. No.: 18/553,500

(22) PCT Filed: Mar. 31, 2022

(86) PCT No.: PCT/GB2022/050812

§ 371 (c)(1),
(2) Date: Sep. 29, 2023

(87) PCT Pub. No.: WO2022/208094

PCT Pub. Date: Oct. 6, 2022

(65) Prior Publication Data

US 2024/0188514 A1 Jun. 13, 2024

(30) Foreign Application Priority Data

Apr. 1, 2021 (GB) .................................... 2104724.6

(51) Int. Cl.
*A01G 24/25* (2018.01)
*A01G 24/42* (2018.01)
*A01G 24/46* (2018.01)

(52) U.S. Cl.
CPC .............. *A01G 24/25* (2018.02); *A01G 24/42* (2018.02); *A01G 24/46* (2018.02)

(58) Field of Classification Search
CPC ......... A01G 24/25; A01G 24/42; A01G 24/46

(Continued)

(56) References Cited

U.S. PATENT DOCUMENTS

| | | | |
|---|---|---|---|
| 2,100,300 A | 11/1937 | Mitchell | |
| 6,041,546 A | 3/2000 | Baranova | |

(Continued)

FOREIGN PATENT DOCUMENTS

| | | | |
|---|---|---|---|
| CA | 3214096 A1 | 10/2022 | |
| CN | 208227933 U | 12/2018 | |

(Continued)

OTHER PUBLICATIONS

Kwon; Lim Tae, "Apparatus for Recovering Recycled Fine Aggregates from Construction Waste" (English Translation), Jan. 15, 2021, worldwide.espacenet.com (Year: 2021).*

(Continued)

*Primary Examiner* — Molly K Devine

(74) *Attorney, Agent, or Firm* — Michael Best & Friedrich LLP

(57) ABSTRACT

A method of manufacturing a growing medium comprises accumulating a particulate material. The particulate material comprises particles having a range of particle sizes. The method further comprises agitating the particulate material which causes smaller particles of particulate material to sink to the bottom of the growing medium under gravity and to thereby displace larger particles of particulate material to the top of the growing medium. There is also provided a growing medium comprising a particulate material defining a volume of particulate material which comprises particles having a range of particle sizes. The concentration of smaller particles of particulate material increases from the bottom of the volume of the particulate material to the top of the volume of the particulate material. The concentration of larger particles of particulate material decreases from the bottom of the volume of particulate material to the top of the volume of particulate material.

19 Claims, 8 Drawing Sheets

2 — Accumulating Particulate Material

4 — Agitating Particulate Material

(58) Field of Classification Search
USPC ................................................... 209/44, 422
See application file for complete search history.

(56) References Cited

U.S. PATENT DOCUMENTS

| | | |
|---|---|---|
| 6,479,433 B1 | 11/2002 | Hann et al. |
| 8,122,642 B1 | 2/2012 | Huberman et al. |
| 2003/0140556 A1 | 7/2003 | Frogley |
| 2004/0216374 A1 | 11/2004 | Davids |
| 2007/0186463 A1 | 8/2007 | Lougheed |
| 2008/0280760 A1 | 11/2008 | Oliver |
| 2014/0260465 A1 | 9/2014 | Lory et al. |
| 2014/0345197 A1 | 11/2014 | Fagin |
| 2016/0037732 A1 | 2/2016 | Brown |
| 2016/0227722 A1 | 8/2016 | Storey |
| 2016/0316640 A1 | 11/2016 | Lepp et al. |
| 2017/0013792 A1 | 1/2017 | Croteau |
| 2017/0105384 A1 | 4/2017 | Waters |
| 2017/0202134 A1 | 7/2017 | Abeles |
| 2017/0283337 A1 | 10/2017 | Gaunt |
| 2017/0318754 A1 | 11/2017 | Hartman |
| 2018/0325046 A1 | 11/2018 | Medhi et al. |
| 2019/0029166 A1 | 1/2019 | Goodman et al. |
| 2019/0133051 A1 | 5/2019 | Witman et al. |
| 2019/0210934 A1 | 7/2019 | Kim et al. |
| 2019/0246591 A1 | 8/2019 | Leo |
| 2019/0352859 A1 | 11/2019 | Hartman |
| 2020/0029513 A1 | 1/2020 | Dijkstra |
| 2020/0207676 A1 | 7/2020 | Chen et al. |
| 2020/0214230 A1 | 7/2020 | Zhong et al. |

FOREIGN PATENT DOCUMENTS

| | | | |
|---|---|---|---|
| CN | 109328979 A | 2/2019 | |
| CN | 208956539 U | 6/2019 | |
| CN | 210491800 U | 5/2020 | |
| CN | 211596833 U | 9/2020 | |
| CN | 212589126 U | 2/2021 | |
| DE | 102007059745 A1 | 6/2009 | |
| DE | 202010016786 U1 | 2/2011 | |
| DE | 102019105148 A1 | 9/2020 | |
| EP | 1082894 A1 | 3/2001 | |
| EP | 1210866 A2 | 6/2002 | |
| EP | 1639885 A1 | 3/2006 | |
| EP | 1869972 A1 | 12/2007 | |
| EP | 2439184 A1 | 4/2012 | |
| EP | 2772131 A1 | 9/2014 | |
| EP | 3037397 A1 | 6/2016 | |
| EP | 3251496 A1 | 12/2017 | |
| EP | 3342278 A1 | 7/2018 | |
| EP | 3400790 A1 | 11/2018 | |
| EP | 4169893 A1 | 4/2023 | |
| EP | 4312513 A1 | 2/2024 | |
| FR | 3016495 A1 | 7/2015 | |
| FR | 3024640 A1 | 2/2016 | |
| FR | 3029737 A1 | 6/2016 | |
| FR | 3064446 A1 | 10/2018 | |
| FR | 3066675 A3 | 11/2018 | |
| FR | 3072858 A1 | 5/2019 | |
| IN | 202041019763 A | 6/2020 | |
| JP | 2011130746 A | 7/2011 | |
| JP | 6209053 B2 | 10/2017 | |
| KR | 102203896 B1 * | 1/2021 | ............... B07B 1/14 |
| WO | WO199857534 A1 | 12/1998 | |
| WO | WO199942422 A2 | 8/1999 | |
| WO | WO200014030 A1 | 3/2000 | |
| WO | WO200101757 A1 | 1/2001 | |
| WO | WO200106837 A1 | 2/2001 | |
| WO | WO200160144 A1 | 8/2001 | |
| WO | WO200200809 A1 | 1/2002 | |
| WO | WO2002059062 A2 | 6/2002 | |
| WO | WO2002076187 A2 | 8/2002 | |
| WO | WO200247470 A1 | 10/2002 | |
| WO | WO2003041487 A2 | 5/2003 | |
| WO | WO2003088739 A2 | 10/2003 | |
| WO | WO2004037748 A1 | 5/2004 | |
| WO | WO2005070852 A1 | 8/2005 | |
| WO | WO2005086992 A1 | 9/2005 | |
| WO | WO2005095542 A1 | 10/2005 | |
| WO | WO2006055050 A1 | 5/2006 | |
| WO | WO2006100065 A1 | 9/2006 | |
| WO | WO2006112700 A1 | 10/2006 | |
| WO | WO2008006181 A2 | 1/2008 | |
| WO | WO2009011905 A1 | 1/2009 | |
| WO | WO2009029645 A2 | 3/2009 | |
| WO | WO2009058869 A1 | 5/2009 | |
| WO | WO2009092127 A1 | 7/2009 | |
| WO | WO2010003399 A1 | 1/2010 | |
| WO | WO2011049786 A2 | 4/2011 | |
| WO | WO2013062416 A1 | 5/2013 | |
| WO | WO2013096849 A1 | 6/2013 | |
| WO | WO2013123447 A1 | 8/2013 | |
| WO | WO2013158316 A1 | 10/2013 | |
| WO | WO2013181343 A2 | 12/2013 | |
| WO | WO2014083231 A1 | 6/2014 | |
| WO | WO2014200949 A2 | 12/2014 | |
| WO | WO2015005775 A1 | 1/2015 | |
| WO | WO2015052615 A1 | 4/2015 | |
| WO | WO2015064944 A1 | 5/2015 | |
| WO | WO2015094550 A1 | 6/2015 | |
| WO | WO2015110554 A1 | 7/2015 | |
| WO | WO2015163760 A1 | 10/2015 | |
| WO | WO2016003901 A1 | 1/2016 | |
| WO | WO2016016407 A1 | 2/2016 | |
| WO | WO2016050594 A1 | 4/2016 | |
| WO | WO2016053781 A1 | 4/2016 | |
| WO | WO2016067114 A2 | 5/2016 | |
| WO | WO2016081234 A1 | 5/2016 | |
| WO | WO2016097301 A1 | 6/2016 | |
| WO | WO2017025711 A2 | 2/2017 | |
| WO | WO2017040485 A1 | 3/2017 | |
| WO | WO2017071823 A1 | 5/2017 | |
| WO | WO2017089957 A1 | 6/2017 | |
| WO | WO2018009944 A1 | 1/2018 | |
| WO | WO2018091902 A1 | 5/2018 | |
| WO | WO2018140607 A1 | 8/2018 | |
| WO | WO2018158677 A1 | 9/2018 | |
| WO | WO2018162902 A1 | 9/2018 | |
| WO | WO2018215508 A1 | 11/2018 | |
| WO | WO2019018881 A1 | 1/2019 | |
| WO | WO2019049156 A1 | 3/2019 | |
| WO | WO2019062516 A1 | 4/2019 | |
| WO | WO2019137981 A1 | 7/2019 | |
| WO | WO2019140289 A2 | 7/2019 | |
| WO | WO2019147759 A2 | 8/2019 | |
| WO | WO2019193580 A1 | 10/2019 | |
| WO | WO2019202548 A1 | 10/2019 | |
| WO | WO2019210426 A1 | 11/2019 | |
| WO | WO2019213263 A1 | 11/2019 | |
| WO | WO2020005307 A1 | 1/2020 | |
| WO | WO2020033324 A1 | 2/2020 | |
| WO | WO2020106484 A1 | 5/2020 | |
| WO | WO2020117062 A1 | 6/2020 | |
| WO | WO2020141461 A2 | 7/2020 | |
| WO | WO2020188840 A1 | 9/2020 | |
| WO | 2022208098 A1 | 10/2022 | |
| WO | 2025003688 A1 | 1/2025 | |

OTHER PUBLICATIONS

Arai; Takashi, "Containerized Garden Soil" (English Translation), Jul. 7, 2011, worldwide.espacenet.com (Year: 2011).*

Budd, "Maths in a minute: the Brazil nut effect," Plus Magazine, Mar. 16, 2018, pp. 1-3, https://plus.maths.org/content/maths-minute-brazil-nut-effect.

International Search Report and Written Opinion for Application No. PCT/GB2022/050812, dated Jul. 5, 2022 (18 pages).

International Preliminary Report on Patentability for Application No. PCT/GB2022/050812, dated Oct. 3, 2023 (10 pages).

United Kingdom Search Report for Application No. GB2104724.6, dated Oct. 1, 2021 (4 pages).

(56)     References Cited

OTHER PUBLICATIONS

Wikipedia: The Free Encyclopedia, "Granular Convection", https://
en.wikipedia.org/w/index.php?title=Granular_convection&oldid=
1050542535, Oct. 18, 2021 (Oct. 18, 2021) (5 pages).
Canadian Patent Office. Office Action for Application No. 3214096,
dated May 8, 2025 (5 pages).

* cited by examiner

2  Accumulating Particulate Material

4  Agitating Particulate Material

2 — Accumulating Particulate Material

4 — Agitating Particulate Material

6 — Re-orientating Growing Medium

2 — Accumulating Particulate Material

4 — Agitating Particulate Material

8 — Compressing Growing Medium

6 — Re-orientating Growing Medium

10 — Removing Outsized Particles

2 — Accumulating First Particulate Material

4 — Agitating First Particulate Material

12 — Accumulating Second Particulate Material

8 — Compressing Growing Medium

6 — Re-orientating Growing Medium

GROWING MEDIUM

The present application is a U.S. National Phase Application of International Application No. PCT/GB2022/050812, filed Mar. 31, 2022, which claims priority to Great Britain Application No. GB 2104724.6, filed Apr. 1, 2021, the entire contents of both of which are herein incorporated by reference.

The present invention relates to growing medium and a method of manufacturing the same.

A typical growing medium comprises a volume of particulate materials, which may be held in a container such as a box or a bag. The properties of the growing medium may be adjusted depending upon the variety and/or maturity of the plant that the growing medium is intended for. Two properties of the growing medium that may be adjusted to suit a particular plant variety and/or maturity are the water holding capacity of the growing medium and the air filled porosity of the growing medium. These properties may depend upon the size of the particulate materials forming the growing medium, amongst other factors.

The water holding capacity of the growing medium is a quantitative measure of the amount of water that the soil can hold in a given volume. Growing mediums with smaller particles typically exhibit a higher water holding capacity than growing mediums with larger particles, since, due to the surface tension of the water, there is a larger surface area of particulate material for water molecules to bind to and be retained by. The air filled porosity of the growing medium is a quantitative measure of the amount of air that the growing medium is able to hold, and therefore how effective the growing medium is at draining. In general, growing mediums with larger particle sizes exhibit a larger air filled porosity.

It is known for the particulate materials forming a growing medium to comprise coconut coir. In this context, "coir" refers to the materials forming the mesocarp, or outer husk, of a coconut. Coir is composed of two principal components, namely coir pith and coir fibres. The coir fibres are long fibrous strands, whilst the coir pith are small floccose, or "fuzzy", particles that bind the fibres coir fibres together in the mesocarp.

A growing medium can be produced by chopping the mesocarp can into small chunks, known as "coco chips". Such coco chips comprise both fibres and pith that have not been separated, so that the fibres and pith are still bound to one another as they would be in the mesocarp. The coco chips are typically screened into different ranges of particle sizes using a series of sieves. Each screened group of particles may form an individual coco chip growing medium.

Some growing mediums may comprise only coco pith, by separating the coir pith from the coir fibres. Such separation is normally achieved using a pair of oppositely facing rollers having stiff bristles configured to penetrate the mesocarp and prise the fibres away from one another to separate them from the pith. The fibres and pith can then be screened from one another using a sieve. The coir pith may be used to form in the growing medium, and the coir fibres may be used to manufacture other products, such as matting.

Coir pith typically comprises particles that are very small, and therefore a growing medium comprising only coir pith may have a relatively high water holding capacity. It is known to cut the coir fibres into short strands and to mix these with the coir pith to produce a growing medium with increased air filled porosity. In this way the water holding capacity and the air filled porosity of the growing medium can be controlled to provide growing mediums for different varieties and/or maturities plant development.

For a given growing medium, the particulate materials typically have a range of particle sizes distributed within a nominal particle size range. For example, the particles may be in the range of around 1 mm to around 5 mm, and the distribution of the particles in this range may define a bell curve (or part of a bell curve). When the growing medium is first manufactured, the particle size distribution is substantially uniform across the entire growing medium. That is to say, a sample taken from any part of the growing medium will exhibit the same particle size distribution (i.e. the same bell curve) as a sample taken from any other part of the growing medium. As such, the water holding capacity and the air filled porosity of the growing medium are generally uniform throughout the newly-manufactured growing medium.

When the growing medium is watered, water will pull smaller particles towards the bottom of the growing medium due to the effect of gravity. As such, the water holding capacity and the air filled porosity of the growing medium will vary throughout the growing medium depending upon location. For example, the bottom of the growing medium may have a moisture content of 70% or more after watering, whereas the moisture content at the top of the growing medium at the same time may be less than 40%. The large difference in moisture content between the top and bottom of the growing medium causes the root system of any plant growing in the medium to grow downwards, leaving much of the top of the growing medium unutilised by the plant's roots. Furthermore, the concentration of the root system at the bottom of the growing medium can have an adverse effect on plant development, as the surface area provided by the root system for water uptake is relatively small. To counteract this, many growers use a larger volume of growing medium for the plant, to allow the root system to spread out.

It is an object of the invention to provide a growing medium to promote more evenly distributed root growth.

It is a further object of the invention to obviate or mitigate at one or more of the disadvantages of the prior art whether described herein or elsewhere.

According to a first aspect of the invention, there is provided a method of manufacturing a growing medium, comprising: accumulating a particulate material, wherein the particulate material comprises particles having a range of particle sizes; and agitating the particulate material to cause smaller particles of particulate material to sink to the bottom of the growing medium under gravity and to thereby displace larger particles of particulate material to the top of the growing medium.

Due to the agitation of the growing medium, the smaller particles of material are positioned at one side of the growing medium and the larger particles are positioned at the other side of the growing medium. In particular, the concentration of smaller particles may increase from a first side of the growing medium to a second side of the growing medium, and the concentration of larger particles may decrease from the first side of the growing medium to the second side of the growing medium. Due to the agitation, this increase in concentration of smaller particles and decrease in the concentration of larger particles may be continuous (or substantially continuous), such that it forms a smooth gradient of changing particle sizes from one side of the growing medium to the other. During use, a plant is grown from the vertically upper side of the growing medium (i.e. from the top of the growing medium). The plant stem and leaves are positioned above the growing medium, whilst the plant roots penetrate downwards and outwards within the growing medium. Because the growing medium has smaller particles on one side than the other, the growing medium can be orientated so that the smaller particles are positioned at the top of the growing medium, and the larger particles of material are positioned at the bottom of the growing medium. Consequently, the water holding capacity of the top of the growing medium is high, whilst the air filled porosity at the top of the growing medium is low. As a result of these properties, the amount of water retained at the top of the growing medium after watering is increased, in counteraction to the effect of gravity. Because more water is retained at the top of the growing medium, root growth near the surface of the growing medium is encouraged, creating a larger root system for the plant and thereby supporting more evenly distributed root growth throughout the growing medium. This promotes better moisture and nutrition uptake and therefore better yield. Due to the improved water retention at the top of the growing medium, the overall volume of growing medium required to support plant growth can be reduced as compared to prior art growing mediums.

Additionally, due to the higher water holding capacity at the top of the growing medium, the top of the growing medium is well suited for supporting the growth of young plants. As the plant matures, as well as growing downwards, the root system of the plant is able to grow horizontally outwards to utilise the space at the top of the growing medium. As such, the growing medium of the present invention also encourages improved development of young plants. This is particularly beneficial for applications in which the plant will live within the growing medium for a long period of time, for example in the production of blueberries, where the blueberry bush will live for up to five years in the same medium.

The term "smaller particles" encompasses particles having a nominal dimension (e.g. a diameter, length or other suitable dimension) less than the median value of all of the particles forming the particulate material. Correspondingly, the term "larger particles" encompasses those particles of the growing medium having a nominal dimension larger than the median value. The terms "smaller" and "larger" may therefore be defined relative to the particle size distribution of all of the particles making up the particulate material.

Subsequent to the step of agitating, the method may further comprise re-orientating the growing medium to place the smaller particles of particulate material vertically above the larger particles of material. By "subsequent to" it will be appreciated that the re-orientation make take place immediately after the agitation step, or after one or more intermediate processing steps have been completed. When the growing medium is re-orientated, the top of the growing medium will have a higher water holding capacity than the bottom of the growing medium. When a plant is grown form the top of the growing medium, water is retained at the top of the growing medium and this encourages improved root growth at the top of the growing medium.

The particulate material may comprise coconut coir. The particulate material may comprise a mixture of coconut coir and other particulate substances. Additionally or alternatively, the particulate material may comprise non-coir material. For example, the particulate material may comprise so called "stone wool" (alternatively, "rock wool"). Stone wool is a substance made from basalt that has been heated to a molten stated, and spun into fibrous strands as it cools. The fibrous strands may form a wool-like substance, and/or may be formed into pellets of various sizes. Either individual strands of stone wool or the pellets of stone wool pellets could be considered to constitute the particles of a particulate material.

The particulate material may comprise a mixture of coir pith and coir fibres. It has been found that by including a mixture of coir pith and coir fibres, the growing medium is able to retain more water and to distribute water more evenly. In particular, the inclusion of coir fibres within the growing medium induces capillary action which acts against gravity and ensures an even distribution of water throughout the growing medium.

The coconut coir may comprise buffered coconut coir. Buffering is a well understood term in the art of coconut coir growing medium production to describe the process of chemically treating the coconut coir to reduce the amount of Potassium and Sodium in the coir. Buffering can take many forms, but typically involves rinsing the coir with water at least once, and subsequently rinsing the coir with a solution of Calcium Nitrate and optionally Magnesium Sulphate and/or other chemicals. Some growing mediums comprise non-buffered coconut coir, however these growing mediums are typically unsuitable for young plants, since the amount of Potassium and Sodium in the coir may be too high. By contrast, the nutritional properties of buffered coir have been adjusted to better suit the nutritional requirements of younger plants.

The method may comprise, prior to the step of accumulating, removing outsized particles from the particulate material. By "prior to" it will be understood that the removal of outsized particles could take immediately before the accumulation step, or alternatively any number of intermediate processing steps may take place.

The step of removing outsized particles may comprise removing particles that are less than around 1 mm, 2 mm, 4 mm, 8 mm or 12 mm in size. That is to say, the particulate materials may be sieved to remove particles capable of passing through a sieve having a mesh size of 1 mm, 2 mm, 4 mm, 8 mm or 12 mm. Fine particles are more likely to bind to one another, and this can prevent an impediment to drainage in the growing medium and prevent sufficient oxygen delivery to the plant roots. By removing particles less than a certain size from the growing medium, the drainage of the growing medium and oxygen distribution within the growing medium can be improved.

The step of removing outsized particles may comprise removing particles that are greater than around 5 mm, 7 mm, 10 mm, 12 mm, 15 mm or 20 mm in size. That is to say, the particulate materials may be sieved to remove particles that are not capable of passing through a sieve having a mesh size of 5 mm, 7 mm, 10 mm, 12 mm, 15 mm or 20 mm. The maximum size of the particles in the growing medium may be chosen in dependence upon the type of plant that the growing medium is intended for, and upon the size and dimensions of the container or growing container in which the growing medium will be contained during plant growth. In general, the larger the container and plant, the coarser the particle sizes.

The particulate materials may have a maximum moisture content of around 15%. The drier the particulate materials, the less agitation required to cause the smaller particles to sink to the bottom of the growing medium and to displace larger particles to the top of the growing medium. It has been found that when the moisture content of the particulate materials is 15% or less, the amount of agitation required is reduced. It has been found that coconut coir is a well suited particulate material for this purpose, as coconut coir can be dried, for example in the sun, to have a moisture content less than 15%. The smaller particles will still settle out adequately if the maximum moisture content is higher than this, and in particular if the maximum moisture content is around 20%, around 25% or around 30%. However this may require more agitation. It may be possible to settle out the smaller particles up to a maximum moisture content of around 50% or around 60%, however around or above this level of moisture the particles begin to stick together making it difficult to settle the smaller particles out. The moisture content of the particulate materials can be measured using a standard moisture meter.

The step of accumulating may include accumulating the particulate material within a container. By accumulating the particulate material within a container, it is easier to agitate the particulate material as it is contained in a single unit. Furthermore, accumulating the particulate material within a container allows the growing medium to be produced in modular batches. Each batch may form a growing medium for a single plant, for example a fruit bush.

The step of agitating may include agitating the particulate material within the container. The step of agitating may include any suitable means of agitation. In one example, the particulate material may be poured into the container from height, and the momentum of the particles hitting the bottom of the container causes the lager particles to bounce and the smaller particles to settle out. The height from which the particulate material is poured may be around 0.3 m, around 0.5 m, around 1 m, around 1.5 m, around 2 m or higher.

The step of agitating the growing medium may comprise vibrating the growing medium. Vibrating the growing medium may include, for example, subjecting a container holding the growing medium to an oscillating motion or a series of pulsatile impacts. For example, the container may be subjected to an oscillating vibration by a suitable vibration mechanism (e.g. an eccentric mechanism). Additionally, or alternatively the container may be shaken by hand or repeatedly impacted against the ground or a wall.

The step of agitating the growing medium may comprise stirring the growing medium. Stirring the growing medium may include, for example, inserting an agitator into the growing medium. The agitator may be, for example, a baffle, a paddle, a rod, a plate or the like. In other embodiments, the agitator may be an operator's hand. The agitator may then be moved within the growing medium, for example in a stirring motion, rotational motion, eccentric motion, or the like thereby agitating the particulate materials. The agitator may be moved by hand or by a suitable agitation mechanism.

The particulate material may be a first particulate material. The method may further comprise, after the step of agitating the first particulate material, accumulating a second particulate material. The method may comprise accumulating any number of additional particulate materials as may be required. For example, the method may comprise accumulating a third particulate material, a fourth particulate material, and so on.

The second particulate material may be accumulated so that it is positioned vertically above the first particulate material. For example, the first particulate material may have been accumulated into a container, and the second particulate material may be accumulated into the same container so that it forms a layer on top of the first particulate material. Additional particulate materials can be accumulated on top of the second particulate material in the same manner.

The method may further comprise the step of agitating the second particulate material. The second particulate material may be agitated in the same manner as the first particulate material as described above in relation to the first particulate material. The second particulate material may be agitated in-situ after it has been accumulated on top of the first particulate material. Additionally or alternatively, the first and second particulate materials may be agitated simultaneously. That is to say, the first particulate material may be accumulated (with or without subsequent agitation), the second particulate material may be accumulated, and then the first and second particulate materials may be agitated together. Additional particulate materials may be agitated in the same manner. By agitating each particulate material, the smaller particles of that particulate material settle to the bottom, and the larger particles of that particulate material are displaced to the top. As such, each layer of particulate material has a higher water holding capacity on one side than the other, to help retain water at a vertically elevated position and encourage better root growth.

The second particulate material may have different physical and/or chemical properties to the first particulate material. For example, the second particulate material may comprise a different variety of growing medium, such as peat, or stone wool. The second particulate material may comprise particles of a different size range or having a different particle size distribution. The second particulate material may comprise a growing medium, such as coconut coir, that has been chemically treated in a different manner to the first growing medium, or even left untreated. Accumulating a second particulate material allows the growing medium to have different chemical and/or particle size properties in the top and bottom parts of the growing medium. Because the plant's root system will have matured by the point that it reaches the second particulate material, a less well refined type of particulate material may be chosen for the second particulate material, which may reduce manufacturing costs without adversely affecting plant growth. This effect can be expanded upon or enhanced by accumulating further particulate materials, for example to provide one or more intermediate stages of partially-buffered coir, or intermediate particle sizes appropriate for a given stage in a plant's root development.

The first particulate material may comprise particles having a range of sizes distributed around a first median particle size, and the second particulate material may comprise particles having a range of sizes distributed around a second median particle size, the first and second median particle sizes being different to one another. Alternatively or additionally, the first particle material may have a different minimum particle size and a different maximum particle size to the second particulate material, and the range defined between the minimum and maximum particle sizes of the first particulate material may be different to the range defined between the minimum and maximum particle sizes of the second particulate material.

The first particulate material may comprise buffered coconut coir, and the second particulate material comprise non-buffered coconut coir. Because the plant will have matured by the time the root system has reached the second particulate material, it will be able to withstand the chemical properties of the non-buffered coir. Non-buffered coir is cheaper to manufacture, and therefore the cost of the growing medium is reduced.

The method may further comprise compressing the growing medium. The step of compressing the growing medium may be carried out after the step of agitating the growing medium and/or after the step or re-orientating the growing medium. Compressing the growing medium allows the volume of the growing medium to be reduced so that it is suitable for shipping. Once water is added to the growing medium, it will re-expand so that it is suitable for receiving a plant.

When the growing medium contains more than one particulate material, the step of compressing the growing medium may comprise compressing all of the accumulated particulate materials in a single compression step, or compressing each of the accumulated particulate materials separately. For example, when the growing medium comprises two particulate materials, the first particulate material may be accumulated, agitated and compressed to form a block of compressed first particulate material, and, separately, the second particulate material may be accumulated, agitated (or not, as required), and compressed to form a block of compressed second particulate material, and block of compressed second particulate material may then be combined with (e.g. placed on top of or under) the block of compressed first particulate material.

The step of compressing the growing medium may be achieved using substantially any suitable compressing apparatus. This may include, for example, a pneumatic or hydraulically actuated press. The compressor may be horizontally or vertically actuated. Preferably, the step of compressing comprises compressing the growing medium in a vertical direction, for example downwards into a container holding the uncompressed growing medium. Using a vertically actuated compressor has been found to result in less spillage of particulate material.

The method may further comprise, subsequent to the step of compressing the growing medium, hydrating the growing medium. Hydrating the growing medium causes it to expand, so that it is suitable for receiving a plant and supporting plant growth. If the growing medium is not hydrated, there is not enough space between the particles to allow root growth. By "subsequent to", it will be appreciated that the hydration step may take place at any point after the compression step. In particular, compression may take place at the location where the growing medium is manufactured, and hydration may take place after the growing medium has been shipped to the location where it will be used for growing plants.

According to a second aspect of the invention, there is provided a growing medium comprising a particulate material defining a volume of particulate material, wherein the particulate material comprises particles having a range of particle sizes, and wherein the concentration of smaller particles of particulate material increases from the bottom of volume of the particulate material to the top of the volume of the particulate material, and wherein the concentration of larger particles of particulate material decreases from the bottom of the volume of particulate material to the top of the volume of particulate material. Put another way the growing medium may comprise a particulate material, wherein the particulate material comprises particles having a range of particle sizes, and wherein the concentration of smaller particles of particulate material increases from the bottom of the growing medium to the top of the growing medium. In this way, smaller particles of particulate material are concentrated at the bottom of the growing medium and larger particles of particulate material are concentrated at the top of the growing medium. This provides the same advantage as the first aspect of the invention, namely that water can be retained at the top of the growing medium against the action of gravity and thereby promote more evenly distributed root growth. In this context, the term "concentration" encompasses the number of particles of a particular size within a given spatial location of the particulate material. The top and the bottom of the growing medium may be defined with respect to the operational position of the growing medium during use, such that the top of the growing medium is the part of the growing medium above which a plant is grown. As such, the size of the particles at the top of the growing medium is smaller than the average size of the particles at the bottom of the growing medium.

The concentration of smaller particles of particulate material may increase continuously, or substantially continuously, from the bottom of the volume of particulate material to the top of the volume of particulate material. The concentration of larger particles of particulate material may decrease continuously, or substantially continuously, from the bottom of the volume of particulate material to the top of the volume of particulate material. Because the increase in concentration of smaller particles and decrease in the concentration of larger particles is continuous (or substantially continuous), this forms a smooth gradient of changing particle sizes from one side of the growing medium to the other. This better supports plant rot growth by avoiding sharp interfaces between regions of different properties in the growing medium.

The growing medium may comprise coconut coir. For example, the growing medium may be a coir substrate. The particulate material may comprise a mixture of coir pith and coir fibres. The coconut coir may be buffered coconut coir. The particles composing the particulate material may be at least around 1 mm in size and/or at most around 5 mm in size.

The particulate material may be a first particulate material, and the growing medium may comprise a second particulate material defining a volume of second particulate material. The volume of second particulate material may be positioned, during use, below the volume of first particulate material. The first particulate material may comprise buffered coconut coir, and the second particulate material may comprise non-buffered coconut coir.

The second particulate material may comprise particles having a range of particle sizes. The concentration of smaller particles of the second particulate material may increase from the bottom of the volume of second particulate material to the top of the volume of second particulate material. The concentration of larger particles of second particulate material may decrease from the bottom of the volume of second particulate material to the top of the volume of second particulate material. In this manner, the second particulate material is also able to support more water retention at the top of the volume of second particulate material. This may help to encourage better root growth at the interface between the first and second volumes of particulate material. It will be appreciated that the growing medium may comprise further volumes or layers of particulate material having concentrations of smaller particles increase from the bottom to the top of the further volume or layer of particulate material in the same fashion.

The concentration of smaller particles of second particulate material may increase continuously, or substantially continuously, from the bottom of the volume of second particulate material to the top of the volume of second particulate material. The concentration of larger particles of second particulate material may decrease continuously, or substantially continuously, from the bottom of the volume of second particulate material to the top of the volume of second particulate material.

According to a third aspect of the invention, there is provided a method of manufacturing a growing medium, comprising: accumulating a first particulate material, wherein the first particulate material comprises particles having a range of particle sizes distributed around a first median particle size; and accumulating a second particulate material, wherein the second particulate material comprises particles having a range of particle sizes distributed around a second median particle size; wherein the first median particle size is smaller than the second particle median particle size.

Because the first median particle size is smaller than the second median particle size, the particles of the first particulate material will be generally smaller than the particles of the second particulate material. Consequently, the water holding capacity of the first particulate material will be higher than the water holding capacity of the second particulate material. As such, the growing medium can be used analogously to the growing medium of the first aspect of the invention, so as to retain water and promote root growth in the first particulate material, which can be re-oriented so that it is vertically above the second particulate material during use.

The first particulate material may comprise buffered coconut coir, and the second particulate material may comprise non-buffered coconut coir. After the step of accumulating the second particulate material, the method may further comprise re-orientating the growing medium to place the first particulate material vertically above second particulate material. The method may further comprise compressing the growing medium.

According to a fourth aspect of the invention, there is provided a growing medium comprising: a first particulate material comprising particles having a range of particle sizes distributed around a first median particle size, a second particulate material comprising particles having a range of particle sizes distributed around a second median particle size, wherein the first median particle size is less than the second median particle size.

Because the first median particle size is less than the second median particle size the particles forming the first particulate material are on average smaller than the particles forming the second particulate material. As such, the water holding capacity of the first particulate material will be higher than the second particulate material, and therefore the first particulate material will be able to retain more water. As such, this provides substantially the same benefit as the first aspect of the invention, namely that water can be retained on one side of the growing medium to encourage plant root growth on that side of the growing medium.

During use, the first particulate material may be positioned above the second particulate material. Because the first particulate material has a higher water holding capacity than the second particulate material, the first particulate material is able to retain water against the action of gravity at a position above the second particulate material. As such, this provides substantially the same benefit as the first aspect of the invention, namely in that the amount of water retained at the top of the growing medium after watering is increased, encouraging root growth near the surface of the growing medium and allowing the overall volume of growing medium to be reduced as compared to prior art growing mediums.

The first particulate material may comprise buffered coconut coir, and the second particulate material comprises non-buffered coconut coir.

According to a fifth aspect of the invention, there is provided a growing container comprising a growing medium according to the second or fourth aspects of the invention.

The term "growing container" as used herein refers to any type of container suitable for holding a growing medium in a manner to support the growth of a plant within the growing medium. Such growing containers may be modular containers such as plant pots, growbags, or troughs. A growing container may be made of any suitable material and have any suitable shape. The size and shape of the growing container may be chosen in dependence upon the type of plant grown and the number of plants grown. Growing containers may range, for example, from around 5 cubic centimetres for supporting the growth of small or young plants, up to, for example, around 250 litres for supporting the growth of large bushes. Such a growing container may receive one or more growing mediums according to the present invention.

According to a sixth aspect of the invention, there is provided the use of a growing medium according to any of claims the second or fourth aspects of the invention for horticulture or agriculture.

It will be appreciated that in the methods described herein, the method steps do not necessarily need to be carried out in the order described, but could be carried out in a different order as would be apparent to a skilled reader.

A detailed description of the invention is set out below with reference to the accompanying drawings, in which:

FIG. 1 is a schematic process diagram showing a method for manufacturing a growing medium in accordance with a first embodiment the present invention. As used herein, a "growing medium" encompasses a substrate (i.e. a "growth substrate" or the like) for supporting the growth of plants.

Figure 1:
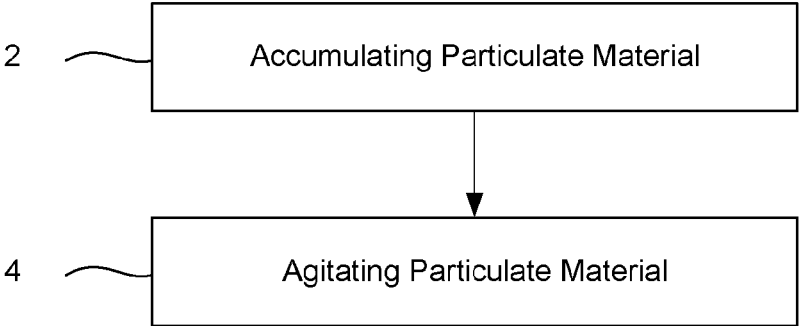
FIG. 1 is a schematic diagram of a method of manufacturing a growing medium according the first aspect of the present invention.

The figure shows a number of method steps described in boxes, with each box representing a step of the method. First, particulate material is accumulated (box 2) to form a growing medium. Following the accumulation of the particulate material, the particulate material is agitated (box 4). As will be described later, additional steps to the method are also possible.

As used herein, a "particulate material" is any material that is composed of a substantially granular structure of small particles. The particles in the particulate material will have a range of particle sizes, although this range could be selected to be relatively narrow or relatively large depending upon the plant to be grown in the growing medium. Particulate materials are well-suited to use as a growing medium, as the individual particles permit plant roots to grow therebetween. As used herein, the term "particulate material" refers to the volume of material as a whole, and not to any individual constituent particle of the material. The particulate material may be any suitable particulate material, for example compost, so-called "stone wool" (alternatively "rock wool"), or peat, but is preferably coconut coir. Preferably, the particulate material is accumulated within a container, such as for example an open-topped rectangular containment vessel such as a box or the like. Accumulating the particulate material in a container enables the growing medium to be processed in batches. Each batch may be suitable for growing a single plant, for example a fruit bush. Alternatively, batches may be combined into long growing containers to grow plants side by side using a common irrigation system, for example for growing tomatoes or strawberries.

The particulate material may be agitated in substantially any suitable manner. For example, the accumulation may be vibrated. This may include subjecting the container within which the particulate material has been accumulated to an oscillating mechanical waveform, such as for example by using an eccentric mechanism connected to the container to transfer oscillating motion thereto. In a simpler form, the container could be shaken by hand. Additionally or alternatively, pulsatile motion can be imparted to the container by subjecting the container to one or more shocks or sudden impacts. Again, a suitable mechanism could be used to produce such pulsatile motion, however at its simplest this could include impacting the container on the ground, against a wall, or with a hammer. In a further addition or alternative, the agitation of the particulate material may comprise stirring the particulate material. This may include, for example, inserting an agitator, such as a baffle, a paddle, a rod or the like, into the growing medium and then moving the agitator within the growing medium. The agitator may be moved by hand or by a suitable agitation mechanism.

The particulate material will include particles of different particle sizes. By agitating the particulate material, the smaller particles of the particulate material settle to the bottom of the container, and thereby displace the larger particles of particulate material to the top of the container. As such, the concentration of smaller particles will increase from one side of the growing medium to the other. In this context, "smaller particles" of particulate material refers to particles that have a nominal dimension less than the median value of all of the particles forming the particulate material. Likewise, "larger particles" of particulate material refer to particles that have a nominal dimension larger than the median value. Because the agitation causes the smaller particles to settle, one side of the growing medium (i.e. the bottom) becomes fine-grained and the other side of the growing medium (i.e. the top) becomes coarse-grained. In particular, the concentration of smaller particles will increase from the coarse-grained side of the growing medium to the fine-grained side of the growing medium. The fine-grained side of the growing medium exhibits a higher water holding capacity than the coarse-grained side. The difference in water holding capacity between the fine-grained and coarse-grained sides of the growing medium enables the growing medium to be used in circumstances where it is desirable to encourage more water to be retained on one side of the growing medium than the other. As will be explained below, this can be used to encourage more even root growth throughout the entire growing medium, which is particularly beneficial for young plants or applications where the plant will live in the growing medium for a long time.

Figure 2:
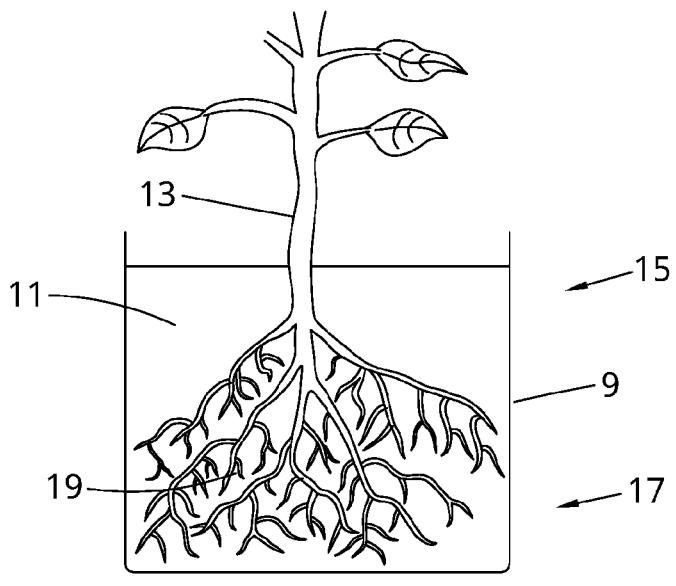
FIG. 2 is a schematic illustration of a root system of a plant grown in a prior art growing medium.

FIG. 2 shows a growing container 9 comprising a prior art coconut coir growing medium 11. The growing container 9 may be, for example, a plant pot, growbag or the like. The growing container 9 is sized for growing a single plant, such as for example a fruit-bearing bush such as blueberry bush. The growing container 9 is generally rectangular, and defines an open top portion from which a plant 13 extends vertically. The growing medium 11 comprises a particulate material having particles of a range of different sizes. The differently sized particles are distributed substantially uniformly throughout the growing medium 11. The growing medium 11 defines an upper portion 15 at the top of the growing container 9, and a lower portion 17 at the bottom of the growing container 9. The plant 13 comprises a root system 19. During use, when the growing medium 11 is watered, due to the action of gravity water will mainly be retained in the lower portion 17. The moisture content of the upper portion 15 may be less than 40% after watering, whereas the moisture content of the lower portion 17 may be as high as 70% or more. As such, the root system 19 is substantially concentrated in the lower portion 17 of the growing container 9, such that the majority of the upper portion 15 of the growing container 9 is unutilised by the root system 19. By experimentation, it has been found that the unutilised portion of the growing container 9 can be up to 30 to 40% of the volume of the growing medium 11.

Figure 3:
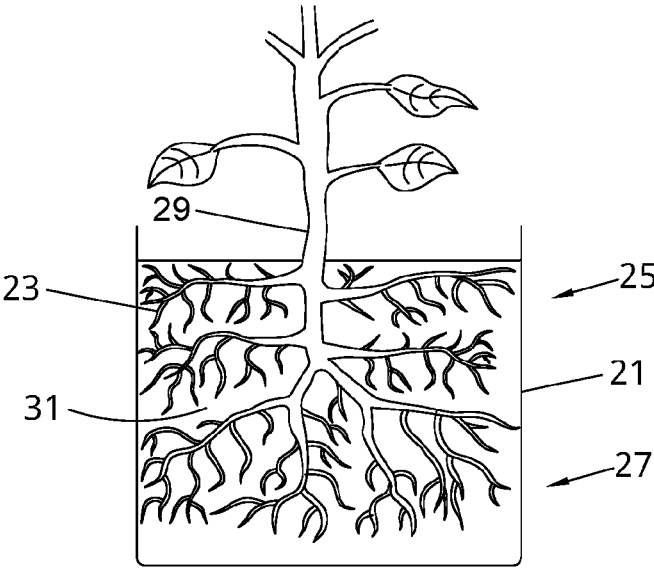
FIG. 3 is a schematic illustration of a root system of a plant grown in a growing medium manufactured according to the first aspect of the present invention.

FIG. 3 shows a growing container 21 according to the present invention. The growing container 21 may be, for example, a plant pot, growbag or the like. The growing container 21 is comparably sized and proportioned relative to the prior art growing container 9, and is again suitable for growing a single plant, such as a fruit-bearing bush. The growing container 21 comprises a coconut coir growing medium 23 according to the present invention that has been manufactured according to the process of FIG. 1 described above. The growing container 21 defines an upper portion 25 at the top of the growing container 21, and a lower portion 27 at the bottom of the growing container 21. As with the prior art growing medium 11, the growing medium 23 according to the present invention comprises a particulate material having particles of a range of different sizes. However, because the particulate material of the inventive growing medium 23 has been agitated as per the method of FIG. 1, the smaller particles are positioned at one side of the growing medium 23 and the larger particles are positioned at the other side of the growing medium 23. The growing medium 23 is positioned so that the smaller particles are in the upper portion 25 and the larger particles are in the lower portion 27. As such, the concentration of smaller particles will increase from the bottom of the growing medium to the top the growing medium.

During use, a plant 29 is grown from the top of the growing medium 22, vertically above the upper portion 25. The plant 29 has a root system 31 that penetrates downwards into the growing medium 23. Because the growing medium 23 has smaller particles in the upper portion 25 than the lower portion 27, the water holding capacity of the upper portion 25 is high. The high water holding capacity of the upper portion 25 counteracts the effect of gravity and allows the upper portion 25 to retain more water than the upper portion 15 of the prior art growing medium 11. It has been found that after watering the moisture content of the upper portion 25 may be around 50% and the moisture content of the lower portion 27 may be around 70%. A difference of less than 20% in moisture content between the upper and lower portion 25, 27 is possible. As shown in FIG. 3, the effect of the increased water holding capacity in the upper portion 25 of the inventive growing medium 23 is that the root system 31 is able to grow both outwards as well as downwards. As such, much more of the growing medium 23 in the upper portion 25 is utilised by the root system 31 than in the prior art described above. By experimentation, it has been found that the unutilised portion of the growing container 21 can be as little as 5% of the volume of the growing medium 23. Consequently, the use of a growing medium 23 that has been agitated produces larger and more evenly distributed root systems. For a given volume of growing container, this leads to larger, healthier plants and improved yield. Furthermore, this allows a smaller growing container volume to be used to produce the same yield from the plant, thus saving costs.

Figure 4:
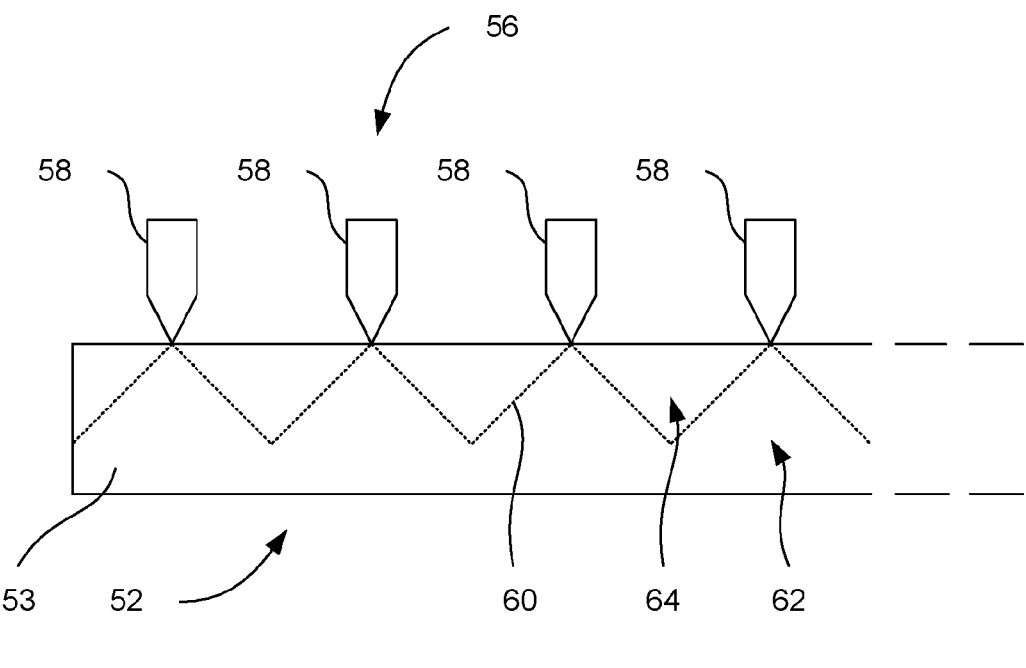
FIG. 4 is a schematic illustration of water dispersion in an elongate prior art growing container.
Figure 5:
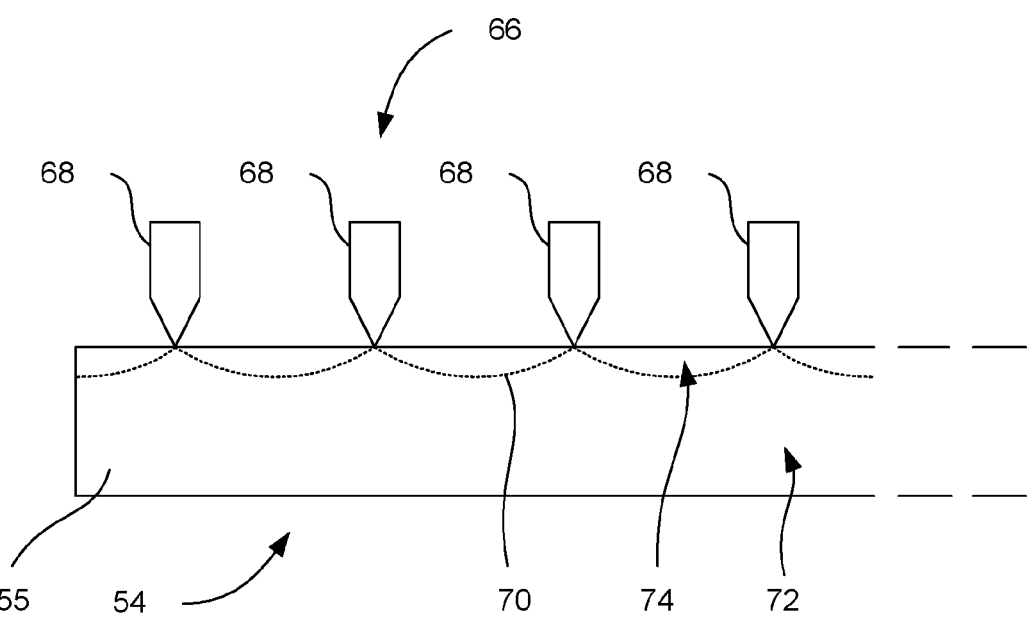
FIG. 5 is a schematic illustration of water dispersion in an elongate growing container comprising a growing medium manufactured according to the first aspect of the present invention.

FIGS. 4 and 5 show a comparison between another prior art growing container 52 a further embodiment of a growing container 54 according to the present invention. In FIGS. 4 and 5, rather than being sized for growing a single plant, the growing containers 52, 54 are elongate so that a number of plants can be grown side-by-side, for example within a polytunnel. The growing containers 52, 54 may be suitable for growing plants such as tomatoes and strawberries. The growing containers 52, 54 may be, for example, elongate polythene growbags, troughs, channels or the like.

With reference to FIG. 4, the growing container 52 comprises a prior art coconut coir growing medium 53 containing a mixture of coir pith and coir fibres. An irrigation system 56 is provided on the growing container 52, the irrigation system 56 comprising a number of drippers 58. Although not shown, the drippers 58 are normally aligned with the base of a plant. The drippers 58 supply water to the top of the growing container 52 and into the growing medium 53. The presence of coir fibres within the growing medium provides a wicking effect that causes the water to spread outwardly in a generally conical manner as it descends through the growing medium 53 under the action of gravity, as shown by the dashed lines 60. The region 62 of the growing medium 53 below the dashed lines 60 is watered by the drippers 58, and root development in these regions is normal. However, the drippers are not able to water the region 64 above the dashed lines 60, which remains dry. Consequently, root development in the unwatered region 64 does not occur or is very poor. Furthermore, over time, ions in the watered region 62 are washed sideways towards the dashed lines 60, causing a build-up of ionic deposits within and bordering the unwatered region 64, forming a further barrier to root development in the unwatered region 64. The build-up of ionic deposits is often a time-consuming and costly for growers to manage, and may require the plants to be potted-on, With reference to FIG. 5, the growing container 54 of the present invention overcomes this problem by reducing the volume of the unwatered regions. The growing container 54 comprises a coconut coir growing medium 55 comprising a mixture of coir fibres and coir pith that has been agitated in accordance with the present invention. The growing medium 55 is oriented so that the larger particles are at the bottom and the smaller particles are at the top. An irrigation system 66 is provided having drippers 68 which are aligned with the bases plants (not shown). In contrast to the prior art growing container 52, because the growing container 54 comprises smaller particles at the top and larger particles at the bottom, the water holding capacity at the top of the growing container 54 is high. Accordingly, the top of the growing container 54 can hold water fed by the drippers 68 against the action of gravity. The presence of coir fibres within the growing medium provides a wicking effect which causes greater lateral dispersion in the water, as shown by the dashed lines 70. Consequently, the volume of the watered region 72 below the dashed lines 70 is increased, and the volume of the unwatered region 74 above the dashed lines 70 is decreased. Therefore, the total volume of the growing container 54 available to support plant root growth is increased. Plant roots tend to grow outwards before growing downwards, and so the use of the agitated growing medium 55 according to the present invention is particularly beneficial for allowing young plants to establish before the roots grow downwards and into competition with adjacent plants. Accordingly, a higher yield can be delivered compared to the prior art growing container 52. Furthermore, because the volume of the watered region 72 has increased, the amount of ionic deposits is reduced, thus leading to time and cost savings for the grower, for example by eliminating the need for potting-on.

Preferably the particulate material has a maximum moisture content of around 15%. It has been found that, in general, the lower the moisture content of the particulate material, the easier it is to cause the smaller particles to settle to the bottom of the container during the agitation step. When the moisture content is above 15% it is still possible for the smaller particles to settle out, however the process will take longer and may require more vigorous agitation to be fully achieved. For this reason, it is preferable to select a particulate material that is easy to dry. It has been found that coconut coir is particularly well suited to this application since coconut coir is easy to dry, for example in the sun.

The particulate material may comprise substantially any particulate coconut coir material. For example, the particulate material may comprise coir pith. Preferably however, the particulate material comprises a mixture of coir pith and coir fibres. In such growing mediums, the coir fibres provide capillary action to ensure that water is evenly distributed throughout the growing medium, and improves the ability of the growing medium to hold water against the action of gravity. The coir pith and the coir fibres may be obtained separately from one another, and may be mixed together to form the particulate material before being accumulated and agitated. In particular, coir pith having a desired range of particle sizes may be obtained by screening, and this screened coir pith may be combined with coir fibres cut to a particular length. For example, the coir pith may have particles in the ranges of 0 to 1 mm, 0 to 5 mm, 2 to 5 mm, 0 to 7 mm, 1 to 7 mm, 0 to 10 mm, 1 to 10 mm, 4 to 7 mm, 7 to 10 mm, 8 to 12 mm, 0 to 20 mm or any combination of the endpoints thereof. The coir fibres may have lengths in the ranges of 3 to 5 mm, 5 to 15 mm, 10 to 15 mm, up to 20 mm, or any combination of the endpoints thereof.

When left untreated, coconut coir contains levels of Potassium and Sodium that may be too high for some applications. For certain plants, if the amount of Potassium and Sodium in the coconut coir is too high the plant may not grow or growth may be stunted. Therefore, it is preferable that the coconut coir is buffered. As will be understood by those skilled in the art, buffered coconut coir is coconut coir that has been chemically treated to introduce, remove or adjust the concentrations of chemical substances that are bonded to the coconut coir itself, so as to make the coconut coir suitable for growing a wider range of plants. Substances and groups of substances which may be introduced to, removed from, or have their concentrations adjusted within the coconut coir may include any one or more of Ammonia, Chlorides, Nitrates, Sulphates, Borates, Phosphates, Copper, Manganese, Zinc, Iron, Potassium, Magnesium, Calcium, Sodium or any other substance having an effect on plant nutrition naturally present in coconut coir. As the skilled person would understand, buffering the coir typically comprises exposing the coconut coir to a buffering solution. By exposure to the buffering solution the concentrations of the above substances, and in particular Potassium and Sodium, can be adjusted. Buffered coconut coir is particularly suitable for young plants, as young plants are typically susceptible to problems caused by high levels of Potassium and Sodium.

Figure 6:
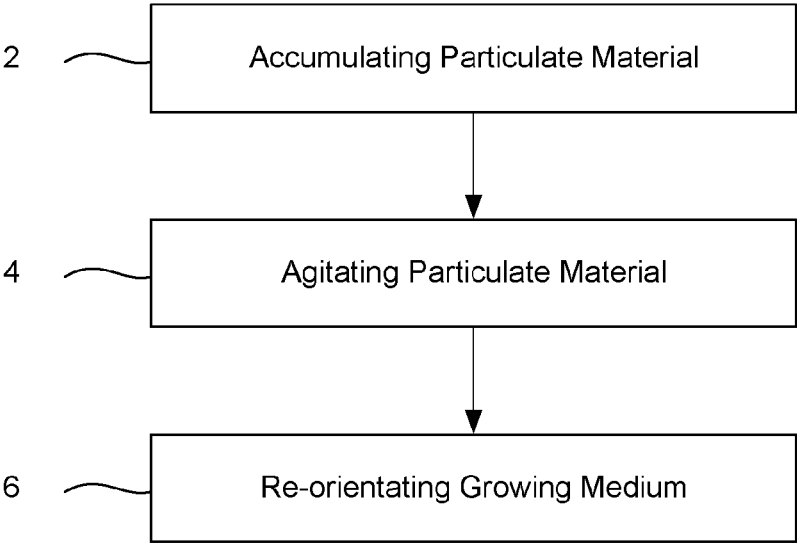
FIG. 6 is a schematic diagram of a further embodiment of the method of manufacturing a growing medium of the first aspect of the present invention.

With reference to FIG. 6, following the step of agitating (box 4), the growing medium may be re-orientated (box 6) so that the smaller particles of particulate material are positioned vertically above the larger particles of particulate material. That is to say, so that the fine-grained side is positioned facing upwards. It will be appreciated that this step could be carried out after manufacture of the growing medium, and therefore is not an essential part of the manufacturing method itself. Nevertheless, by re-orientating the growing medium in this way, the water holding capacity at the top of the growing medium is larger than the water holding capacity at the bottom of the growing medium, as in the example of FIG. 3 above.

Figure 7:
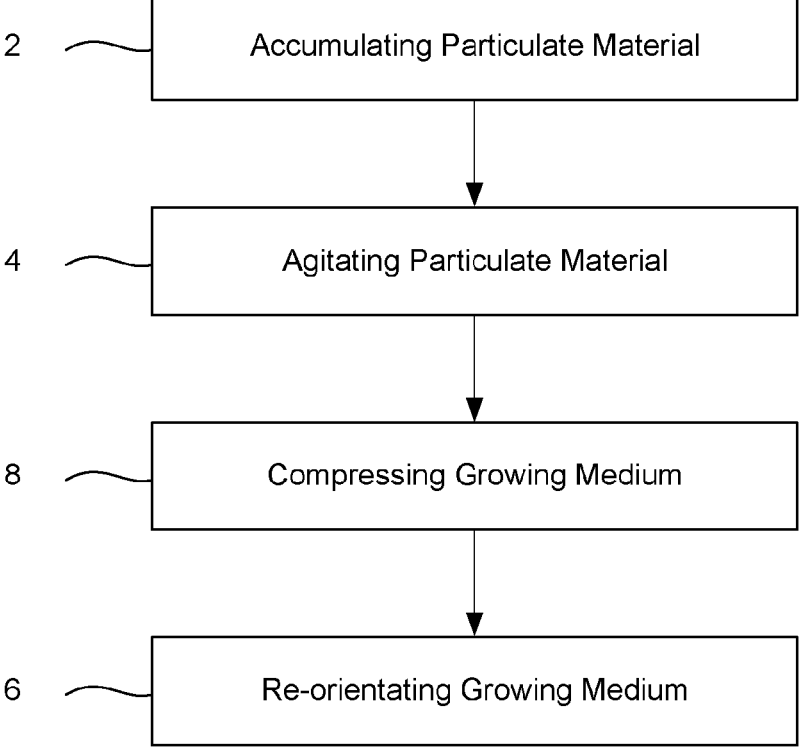
FIG. 7 is a schematic diagram of another embodiment of the method of manufacturing a growing medium of the first aspect of the present invention.

With reference to FIG. 7, in some embodiments, between the step of agitating the growing medium (box 4) and the step of re-orientating the growing medium (box 6), the growing medium may be compressed (box 8). Compression of the growing medium may be achieved, for example, by inserting a plate into the top of the container to "squeeze" the particulate material against the bottom and sides of the container. This may be carried out using a hydraulic or pneumatic press or the like. Once compressed, the overall volume of the growing medium will be reduced, thus making the growing medium easier to transport and store. Furthermore, compressing the growing medium causes the growing medium to solidify into a single block or "brick", thus making the growing medium easier to handle during shipping. Once the compressed growing medium arrives at its destination, the user can simply water the growing medium to cause it to re-expand into its original shape.

A growing container according to the present invention may be provided by placing a compressed block of growing medium that has been agitated according to the inventive method within a bag. The bag preferably has an open top or and aperture for receiving plants. The growing container may be any suitable shape or size depending upon the type of plant it is designed for use with. For example, the growing container may be designed to hold a single plant, such as a fruit bush. In this case, the growing container may comprise one or more blocks of compressed growing medium that are stacked vertically on top of one another (such as in FIGS. 2, 3 and 10). Alternatively, the growing container may be designed for use with plants that are planted in rows, such as tomatoes, strawberries, or the like. In this case, the growing container may be generally elongate (such as in FIGS. 4 and 5) and may comprise one or more layers of compressed blocks of growing medium that are arranged side-by-side along the length of the growing container. The compressed growing medium can be hydrated (i.e. watered) to cause it to expand so that the particles are loose enough to receive a plant and support plant growth.

Figure 8:
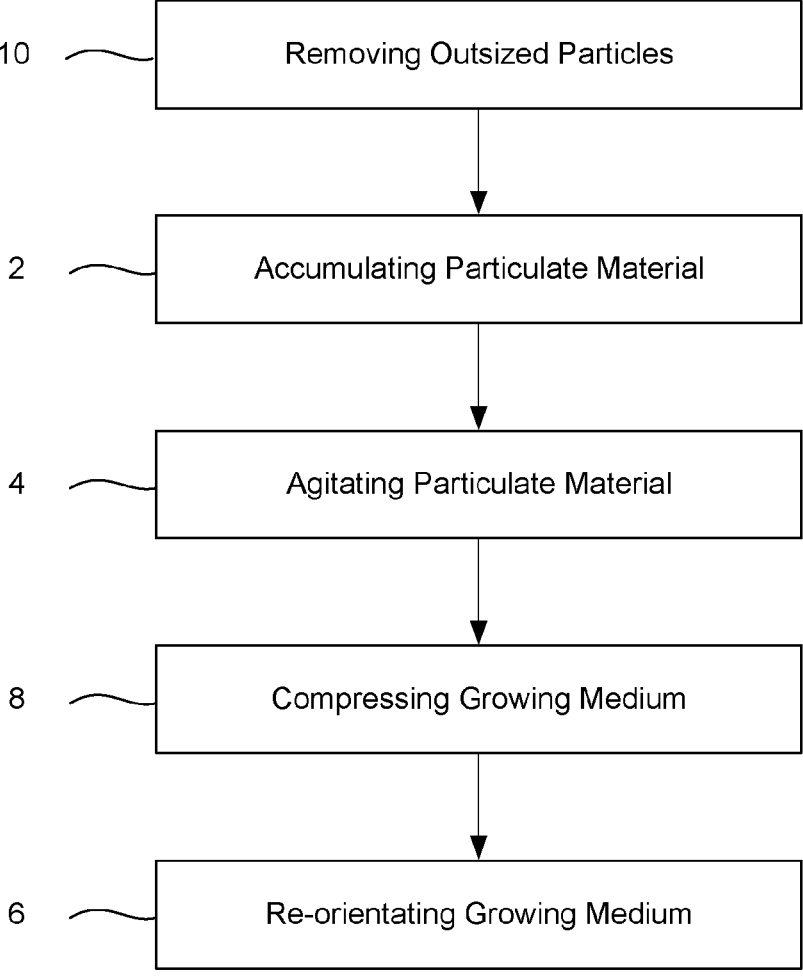
FIG. 8 is a schematic diagram of a further embodiment of the method of manufacturing a growing medium of the first aspect of the present invention.

With reference to FIG. 8, before the step of accumulating (box 2), the method may further comprise the step of removing outsized particles of the particulate material (box 10). This may include, for example, screening out particles that are below a certain size and/or screening out particles that are above a certain size. Such screening may be achieved using a sieve. The precise size of the particles screened out may be chosen in dependence upon the intended application of the growing medium, for example the type of plant that will be grown.

Preferably, particles of around 1 mm or less are removed from the particulate material using, for example, a 1 mm gauge sieve. In other embodiments, particles of around 2 mm or less, 4 mm or less, 8 mm or less, or 12 mm or less may be screened out in the same manner using an appropriately sized mesh. It has been found that if particles smaller than this size remain in the growing medium this causes the air filled porosity at the top of the growing medium, following its re-orientation,) to be too low, and thus the growing medium does not drain properly. Put another way, the particles a so small that they "clog up" when watered, preventing adequate drainage, depriving the roots of oxygen and making root rot more likely. However, removing particles below this size strikes a balance between increasing the air filled porosity at the top of the growing medium without sacrificing too much water holding capacity in the same region.

Additionally or alternatively, particles of around 5 mm or more may be removed from the particulate material. In other embodiments, particles of around 7 mm or more, 10 mm or more, 12 mm or more, 15 mm or more, or 20 mm or more may be removed from the particulate material. By removing particles larger than this value, this ensures that once the particulate material has been agitated, the particles on the coarse-grained side still exhibit a sufficiently high water holding capacity to promote root growth.

Figure 9:
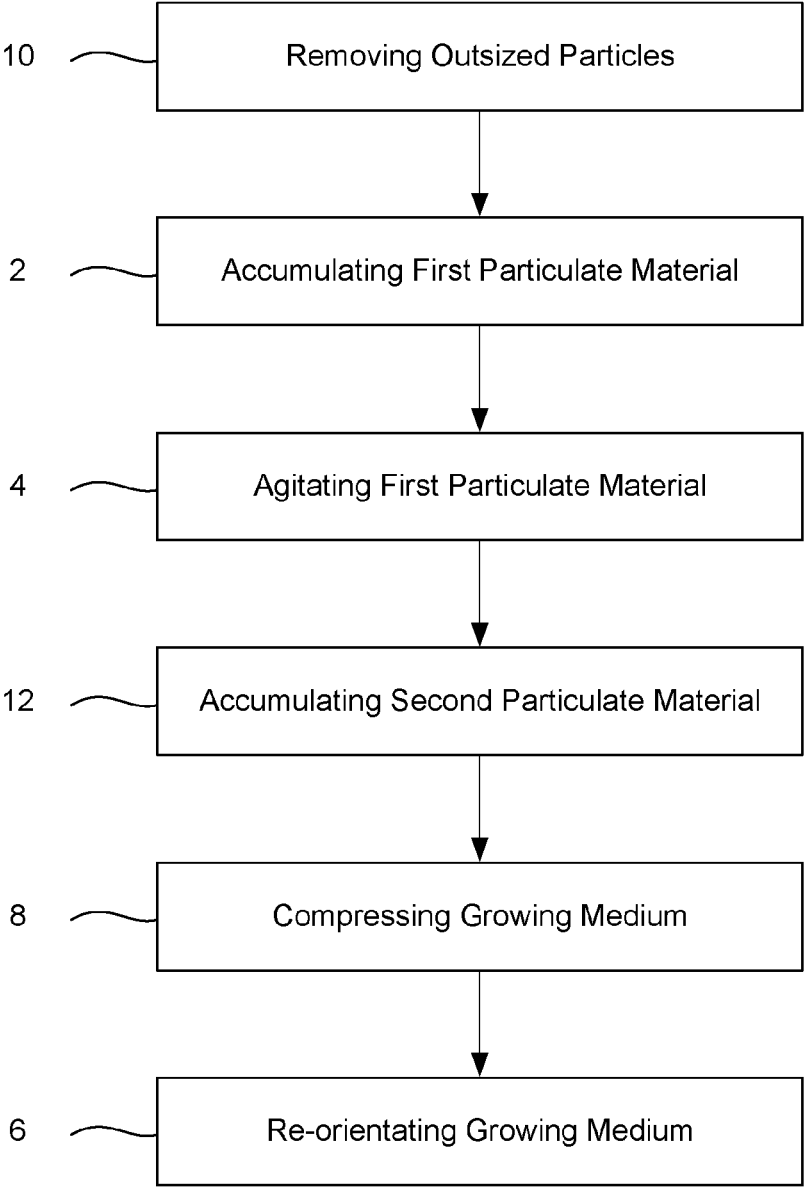
FIG. 9 is a schematic diagram of a further embodiment of the method of manufacturing a growing medium of the first aspect of the present invention.

With reference to FIG. 9, a further method of manufacturing a growing medium according to the present invention is shown. In this embodiment, the particulate material accumulated during the accumulation step (box 2) is considered a first particulate material and, after the first particulate material is agitated, the method further comprises the step of accumulating a second particulate material (box 12). The second particulate material may be accumulated in the same container as the first particulate material, and may in particular be positioned vertically above the first particulate material. Because the second particulate material is accumulated on top of the first particulate material, once the growing medium is re-orientated (box 6) the second particulate material will be positioned below the first particulate material.

Figure 10:
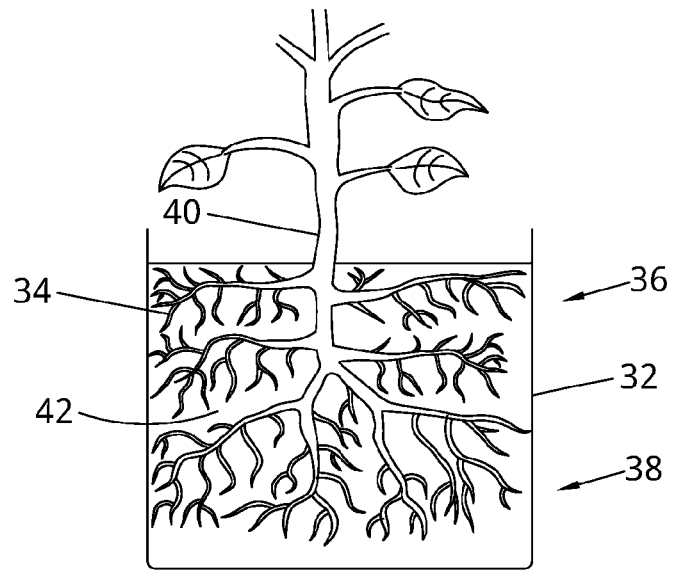
FIG. 10 is a schematic illustration of a root system of a plant grown in a growing medium according to the method of FIG. 9.

With reference to FIG. 10, a growing container 32 comprises a growing medium 34 manufactured according to the method of FIG. 9 is shown. The growing medium 34 comprises a first particulate material 36 in an upper portion thereof and a second particulate material 38 in a lower portion thereof. A plant 40 having a root system 42 is grown in the growing medium 34. Because the first particulate material 36 has been agitated, root growth at the top of the growing medium 34 is encouraged.

Furthermore, the root system 42 of the plant 40 will only come into contact with the second particulate material 38 once the plant 40 has begun to mature. Consequently, the physical and chemical properties of the second particulate material 38 do not need to be as tightly controlled or as well refined as the physical and chemical properties of the first particulate material 36, as the plant 40 will be able to withstand greater variations in growing medium properties. The second particulate material 38 is therefore preferably a different particulate material to the first particulate material 36. In particular, the second particulate material may have different chemical properties to the first particulate material. In a preferred embodiment, the first particulate material may comprise buffered coconut coir and the second particulate material may comprise non-buffered coconut coir. Using a combination of buffered and non-buffered coir saves manufacturing costs, whilst positioning the non-buffered coconut coir below the buffered coconut coir minimises any potential adverse effects on the plant.

Furthermore, the second particulate material 38 may have a different distribution of particle sizes and may have different maximum and minimum particle sizes. In particular, the first particulate material 36 may define a first median particle size and the second particulate material 38 may define a second median particle size, the first median particle size being smaller than the second median particle size. Alternatively or additionally, the minimum and maximum particle sizes of the first and second particulate materials may be different to one another. The step of removing outsized particles (box 10) may comprise removing outsized particles from the first and/or second particulate materials. Because of the difference in particle sizes, the first and second particulate materials 36, 38 will naturally have different water holding capacities, and therefore the size properties of the two materials may be chosen to further encourage root growth towards the top of the growing medium 34.

Figure 11:
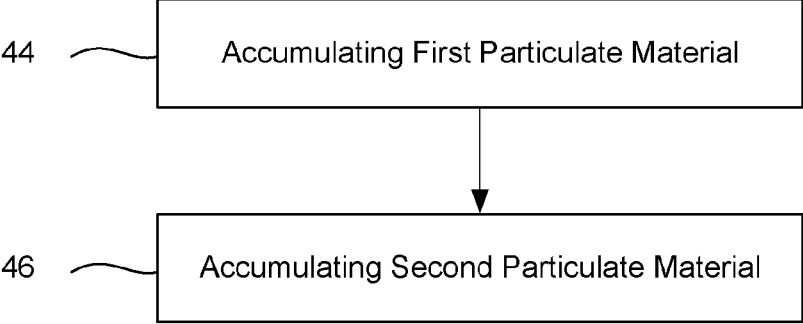
FIG. 11 is a schematic diagram of a method of manufacturing a growing medium according the third aspect of the present invention.

FIG. 11 shows an alternative method for manufacturing a growing medium according to the third present invention. In this method, a first particulate material is accumulated (box 44), for example in a container. Next, a second particulate material is accumulated (box 46), for example in the same container as the first particulate material. As such, the second particulate material may be positioned vertically above the first particulate material in the container. The first particulate material comprises particles having a range of particle sizes distributed around a first median particle size, and the second particulate material comprises particles having a range of particle sizes distributed around a second median particle size. The first median particle size is smaller than the second particle median particle size. In contrast to the previously described embodiments, in the embodiment of FIG. 11 neither the first particulate material nor the second particulate material are agitated. However, because the first median particle size is smaller than the second median particle size, the particles of the first particulate material are, in general, smaller than the particles of the second particulate material. As such, the water holding capacity of the first particulate material is higher than the water holding capacity of the second particulate material. Therefore, the growing medium manufactured according to the method of FIG. 11 is able to provide an analogous effect to the growing medium 22 of FIG. 3. Namely this is that water can be retained on one side of the growing medium rather than the other, so as to encourage more even root growth. Preferably, the first particulate material comprises buffered coconut coir, and the second particulate material comprises non-buffered coconut coir.

Figure 12:
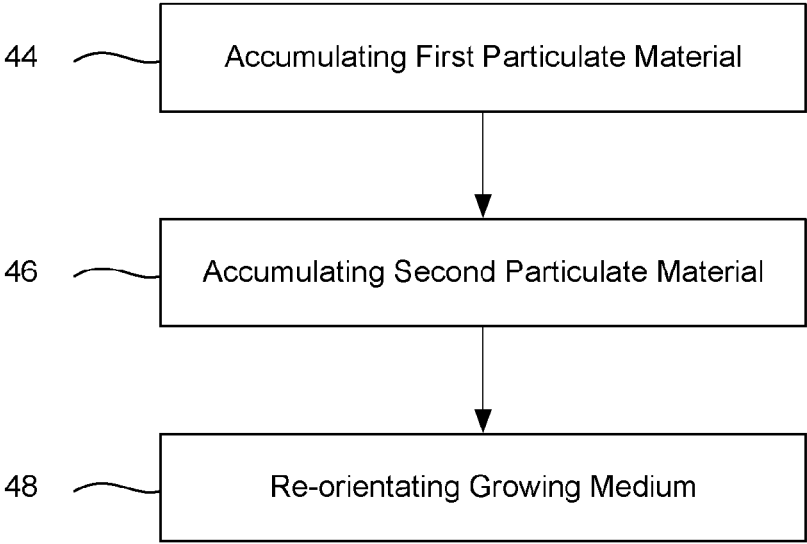
FIG. 12 is a schematic diagram of a further embodiment of the method of manufacturing a growing medium of the third aspect of the present invention.

FIG. 12 shows a further embodiment of a method of manufacturing a growing medium based upon the embodiment of FIG. 11. Following the step of accumulating the second particulate material (box 46), the growing medium is re-orientated to place the first particulate material vertically above the second particulate material. This step may take place away from the manufacturing facility, and it will be appreciated this is not necessarily essential to work the invention. Once re-orientated, a plant can be grown from the top of the growing medium in the usual manner.

Figure 13:
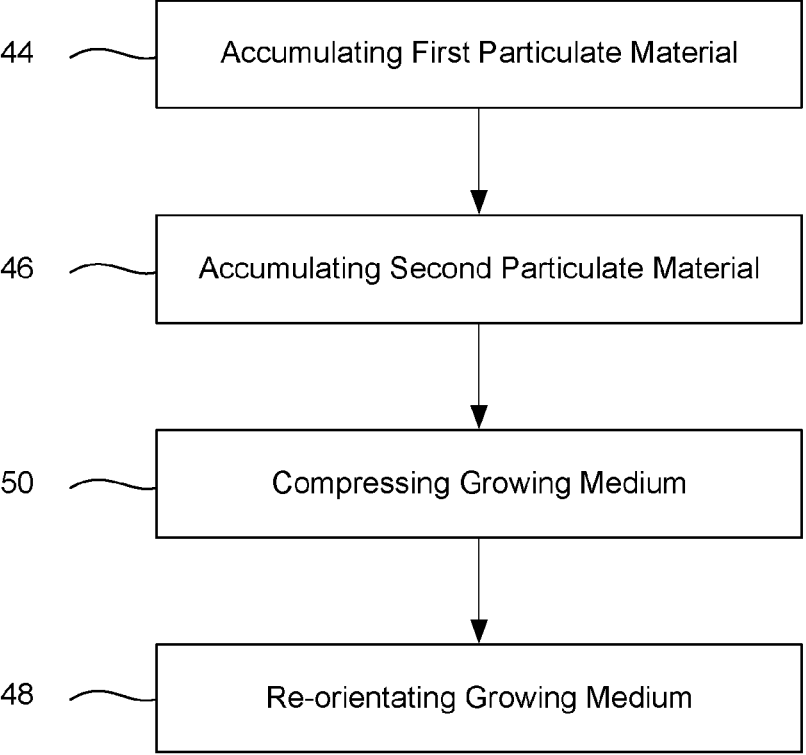
FIG. 13 is a schematic diagram of another embodiment of the method of manufacturing a growing medium of the third aspect of the present invention.

FIG. 13 shows a further embodiment of the method of FIG. 11. In this embodiment, between the step of accumulating the second particulate material (box 46) and re-orientating the growing medium (box 48), the growing medium is compressed (box 50). Compressing the growing medium in this context may comprise compressing the first and second growing medium simultaneously in the container to form a single block or "brick". However, in alternative embodiments of the invention the first and second particulate materials may be accumulated in separate containers and compressed into individual bricks. A brick of compressed first particulate material may then be combined with a brick of compressed second particulate material to form a growing medium.

Although not shown in the figures, further embodiments based on the method of FIGS. 11 to 13 are possible. This may include, for example, before accumulating the first and/or second particulate materials a step of removing outsized particles form the first and/or second materials in the manner described above in relation to FIG. 9.

It will be appreciated that, for any of the embodiments and/or aspects described above, more than two particulate materials may be accumulated to form a growing medium. In particular, the growing medium may comprise a third particulate material, and/or a fourth particulate material and so on. The physical and/or chemical properties of the different particulate materials may be chosen to suit a particular application. One or more of the particulate materials may be agitated to cause smaller particles to gather at one side of that particulate material than the other. This or these particulate materials may be compressed into individual bricks and assembled with one another to form a growing medium, or may be compressed simultaneously in a container.

The invention claimed is:

1. A method of manufacturing a coconut coir growing medium, comprising:

accumulating a particulate material of coconut coir, wherein the particulate material comprises particles having a range of particle sizes; and agitating the particulate material to cause smaller particles of particulate material to sink to the bottom of the growing medium under gravity and to thereby displace larger particles of particulate material to the top of the growing medium.

2. A method according to claim 1, wherein subsequent to the step of agitating, the method further comprises re-orientating the growing medium to place the smaller particles of particulate material vertically above the larger particles of particulate material.

3. A method according to claim 1, wherein the coconut coir is buffered coconut coir.

4. A method according to claim 1, wherein method comprises, prior to the step of accumulating, removing outsized particles from the particulate material.

5. A method according to claim 1, wherein the particulate materials have a maximum moisture content of 15%.

6. A method according to claim 1, wherein the particulate material is a first particulate material, and wherein the method further comprises, after the step of agitating the first particulate material, accumulating a second particulate material.

7. A method according to claim 6, wherein the step of accumulating the second particulate material comprises accumulating the second particulate material vertically above the first particulate material.

8. A method according to claim 6, further comprising the step of agitating the second particulate material.

9. A method according to claim 6, wherein the first particulate material comprises buffered coconut coir, and wherein the second particulate material comprises non-buffered coconut coir.

10. A method according to claim 1, wherein the method further comprises compressing the growing medium.

11. A method according to claim 10, wherein the method comprises, subsequent to the step of compressing the growing medium, hydrating the growing medium.

12. A coconut coir growing medium comprising:

a particulate material defining a volume of particulate material of coconut coir, wherein the particulate material comprises particles having a range of particle sizes, wherein the particulate material is configured to be agitated to thereby cause smaller particles of the particulate material to settle to the bottom of the volume of particulate material, and to cause the larger particles of the particulate material to be displaced to the top of the volume of particulate material, and wherein after the particulate material is configured to be agitated, the particulate material is configured to be re-oriented, such that the concentration of smaller particles of particulate material increases from the bottom of the volume of the particulate material to the top of the volume of the particulate material, and wherein the concentration of larger particles of particulate material decreases from the bottom of the volume of particulate material to the top of the volume of particulate material.

13. A growing medium according to claim 12, wherein the concentration of smaller particles of particulate material increases continuously from the bottom of the volume of particulate material to the top of the volume of particulate material; and wherein the concentration of larger particles of particulate material decreases continuously from the bottom of the volume of particulate material to the top of the volume of particulate material.

14. A growing medium according to claim 12, wherein the coconut coir comprises buffered coconut coir.

15. A growing medium according to claim 12, wherein the particulate material is a first particulate material, and wherein the growing medium comprises a second particulate material defining a volume of second particulate material.

16. A growing medium according to claim 15, wherein the volume of second particulate material is positioned, during use, below the volume of first particulate material.

17. A growing medium according to claim 15, wherein the first particulate material comprises buffered coconut coir, and wherein the second particulate material comprises non-buffered coconut coir.

18. A growing medium according to claim 15, wherein the second particulate material comprises particles having a range of particle sizes, and wherein the concentration of smaller particles of the second particulate material increases from the bottom of the volume of second particulate material to the top of the volume of second particulate material; and wherein the concentration of larger particles of second particulate material decreases from the bottom first side of the volume of second particulate material to the top second side of the volume of second particulate material.

19. A growing medium according to claim 18, wherein the concentration of smaller particles of second particulate material increases continuously from the bottom first side of the volume of second particulate material to the top second side of the volume of second particulate material; and wherein the concentration of larger particles of second particulate material decreases continuously from the bottom first side of the volume of second particulate material to the top second side of the volume of second particulate material.

* * * * *